United States Patent
Shacham et al.

(10) Patent No.: US 9,582,437 B2
(45) Date of Patent: Feb. 28, 2017

(54) PROVIDING INPUT/OUTPUT VIRTUALIZATION (IOV) BY MAPPING TRANSFER REQUESTS TO SHARED TRANSFER REQUESTS LISTS BY IOV HOST CONTROLLERS

(71) Applicant: QUALCOMM Incorporated, San Diego, CA (US)

(72) Inventors: Assaf Shacham, Zichron Yaakov (IL); Dolev Raviv, Kiryat-Yam (IL); David Teb, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/728,343

(22) Filed: Jun. 2, 2015

(65) Prior Publication Data

US 2015/0347016 A1 Dec. 3, 2015

Related U.S. Application Data

(60) Provisional application No. 62/007,136, filed on Jun. 3, 2014.

(51) Int. Cl.
*G06F 12/00* (2006.01)
*G06F 13/16* (2006.01)
*G06F 3/06* (2006.01)

(52) U.S. Cl.
CPC .......... *G06F 13/16* (2013.01); *G06F 3/06* (2013.01); *G06F 3/061* (2013.01); *G06F 3/0664* (2013.01); *G06F 3/0688* (2013.01)

(58) Field of Classification Search
CPC .......... G06F 3/061; G06F 3/06; G06F 3/0664; G06F 13/16; G06F 3/0688

(Continued)

(56) References Cited

U.S. PATENT DOCUMENTS 7,480,784 B2 1/2009 Hummel et al.
7,873,770 B2 1/2011 Hummel et al.
(Continued)

FOREIGN PATENT DOCUMENTS

EP 2492916 A1 8/2012
WO 2012143945 A2 10/2012
(Continued)

OTHER PUBLICATIONS

Author Unknown, "Embedded MultiMediaCard (e•MMC) e•MMC/Card Product Standard, High Capacity, including Reliable Write, Boot, Sleep Modes, Dual Data Rate, Multiple Partitions Supports and Security Enhancement," JEDEC Solid State JESD84-A44, Mar. 2009, JEDEC Solid State Technology Association, 234 pages.
(Continued)

*Primary Examiner* — Hong Kim
(74) *Attorney, Agent, or Firm* — Withrow + Terranova, PLLC

(57) ABSTRACT

An input/output virtualization (IOY) host controller (HC) (IOV-HC) of a flash-memory-based storage device is disclosed. In one aspect, an IOV-HC is coupled to input/output (I/O) clients via corresponding client register interfaces (CRIs), and is also coupled to a flash-memory-based storage device. The IOV-HC comprises transfer request list (TRL) slot offset registers indicating slots of a shared TRL that are assigned as base slots to each of the CRIs. The IOV-HC further comprises TRL slot count registers indicating how many slots of the shared TRL are assigned to each of the CRIs. When a transfer request (TR) directed to the flash-memory-based storage device is received from a CRI, the IOV-HC is configured to map the TR to a slot of the shared TRL based on a TRL slot offset register and a TRL slot count register of the plurality of TRL slot count registers corresponding to the CRI.

23 Claims, 10 Drawing Sheets

(58) Field of Classification Search
USPC .................. 711/154, 103, 6; 710/5; 709/201
See application file for complete search history.

(56) References Cited

U.S. PATENT DOCUMENTS

| | | | |
|---|---|---|---|
| 8,301,715 B2 | 10/2012 | Ittah et al. | |
| 8,631,212 B2 | 1/2014 | Kegel et al. | |
| 8,949,517 B2 | 2/2015 | Cohen et al. | |
| 8,996,734 B2 | 3/2015 | Kanigicherla et al. | |
| 9,003,088 B2 | 4/2015 | Chandrasekhar et al. | |
| 2010/0161936 A1* | 6/2010 | Royer .................... | G06F 3/061 711/209 |
| 2011/0283046 A1* | 11/2011 | Koseki ................... | G06F 3/061 711/103 |
| 2012/0030408 A1 | 2/2012 | Flynn et al. | |
| 2013/0060981 A1 | 3/2013 | Horn et al. | |
| 2013/0159572 A1 | 6/2013 | Graham et al. | |
| 2013/0275656 A1 | 10/2013 | Talagala et al. | |
| 2013/0290606 A1 | 10/2013 | Alessi et al. | |
| 2014/0040527 A1 | 2/2014 | Kanigicherla et al. | |
| 2014/0068137 A1 | 3/2014 | Kegel et al. | |
| 2014/0325013 A1 | 10/2014 | Tamir et al. | |
| 2014/0331223 A1 | 11/2014 | Lee et al. | |
| 2015/0012671 A1 | 1/2015 | Park et al. | |
| 2015/0074338 A1* | 3/2015 | Raviv ................... | G06F 13/385 711/103 |
| 2015/0242268 A1 | 8/2015 | Wu et al. | |
| 2015/0346795 A1 | 12/2015 | Shacham et al. | |
| 2015/0347017 A1 | 12/2015 | Shacham et al. | |

FOREIGN PATENT DOCUMENTS

| | | |
|---|---|---|
| WO | 2013109640 A1 | 7/2013 |
| WO | 2014141140 A1 | 9/2014 |

OTHER PUBLICATIONS

Author Unknown, "Universal Flash Storage (UFS 1.1)," JEDEC Standard JESD220A, Jun. 2012, JEDEC Solid State Technology Association, 408 pages.
Author Unknown, "Device.Storage Requirements," Microsoft, Jan. 17, 2014, 130 pages.
Author Unknown, "Universal Flash Storage (UFS) Host Controller Interface," JEDEC Standard JESD223, Aug. 2011, JEDEC Solid State Technology Association, 58 pages.
De Jong, I.J., "System Exploration of Next Generation Flash Devices," Thesis, Faculty Electronic Engineering and Faculty Wiskunde & Informatica, Eindhoven University of Technology, Aug. 2012, 79 pages.
International Search Report and Written Opinion for PCT/US2015/033953, mailed Aug. 11, 2015, 9 pages.
International Preliminary Report on Patentability for PCT/US2015/033953, mailed Dec. 15, 2016, 7 pages.

\* cited by examiner

PROVIDING INPUT/OUTPUT VIRTUALIZATION (IOV) BY MAPPING TRANSFER REQUESTS TO SHARED TRANSFER REQUESTS LISTS BY IOV HOST CONTROLLERS

PRIORITY CLAIM

The present application claims priority to U.S. Provisional Patent Application Ser. No. 62/007,136 filed on Jun. 3, 2014 and entitled "MULTI-HOST UNIVERSAL FLASH STORAGE (UFS)," the contents of which is incorporated herein by reference in its entirety.

BACKGROUND

I. Field of the Disclosure

The technology of the disclosure relates generally to flash-memory-based storage in mobile computing devices.

II. Background

Flash memory is a non-volatile data storage medium to which data may be electronically written and erased. Flash memory is presently used in a variety of flash-memory-based storage devices, including memory cards, solid-state drives, and Universal Serial Bus (USB) flash drives. Flash-memory-based storage devices may offer fast read and write times comparable to dynamic Random Access Memory (RAM) while providing higher durability and shock resistance than conventional hard disks.

To facilitate the widespread use of flash-memory-based storage devices, a number of standards have been developed or are currently under development. One such standard is Universal Flash Storage (UFS), developed by the Joint Electron Device Engineering Council (JEDEC) for flash-memory-based storage in mobile computing devices, such as smart phones and tablet computers. UFS adopts the Small Computer System Interface (SCSI) Architecture Model and command protocols supporting multiple commands with command queuing features, thus enabling a multi-thread programming paradigm. Another standard developed by JEDEC is the Embedded MultiMediaCard (eMMC) standard, which offers a simplified application interface design, small package sizes, and low power consumption. eMMC flash-memory-based storage devices are presently one of the primary forms of storage in mobile devices.

Conventional flash-memory-based storage device standards, such as UFS and eMMC, are currently designed for management and usage by a single input/output (I/O) client. However, many modern computing devices are capable of supporting multiple I/O clients (e.g., hosts or other processor subsystems) simultaneously using virtualization environments. In such virtualization environments, multiple I/O clients may each need to interact with a single flash-memory-based storage device as if it were the only host of the flash-memory-based storage device. Similarly, the flash-memory-based storage device may need to operate as if it is communicating with only a single I/O client, when, in fact, it is communicating with multiple I/O clients.

In particular, a conventional host controller (HC) for a flash-memory-based storage device may provide a transfer request list (TRL) made up of multiple "slots" (also referred to under some standards as a task descriptor list (TDL), comprising multiple task descriptors (TDs)). The slots may be used by an I/O client for issuing transfer requests (TRs), such as read/write transactions, to the flash-memory-based storage device. However, to provide access to the flash-memory-based storage device in a multi-host environment, the HC may need to allow multiple I/O clients to access the TRL, as opposed to a single host.

SUMMARY OF THE DISCLOSURE

Aspects disclosed in the detailed description include an input/output virtualization (IOV) host controller (HC) (IOV-HC) of a flash-memory-based storage device. In this regard, in one aspect, an IOV-HC provides access to a flash-memory-based storage device to multiple input/output (I/O) clients within a single system on a system-on-chip (SoC). In particular, the IOV-HC provides storage access to multiple I/O clients by providing a shared transfer request list (TRL), which comprises physical "slots" for issuing transfer requests (TRs), such as read/write transactions, to the flash-memory-based storage device. The IOV-HC implements a number of client register interfaces (CRIs), each of which is provided with its own virtual TRL that is made up of a subset of the slots of the shared TRL. The virtual TRLs are defined by TRL slot offset registers and TRL slot count registers maintained by the IOV-HC. Using the virtual TRLs, the IOV-HC may efficiently process TRs from multiple I/O devices to the flash-memory-based storage device and responses provided by the flash-memory-based storage device to the multiple I/O clients, in a manner transparent to the multiple I/O clients.

In another aspect, an IOV-HC is provided. The IOV-HC is communicatively coupled to a plurality of input/output (I/O) clients via a corresponding plurality of client register interfaces (CRIs), and is also communicatively coupled to a flash-memory-based storage device. The IOV-HC comprises a plurality of transfer request list (TRL) slot offset registers, each indicating a slot of a shared TRL that is assigned as a base slot to each CRI of the plurality of CRIs. The IOV-HC further comprises a plurality of TRL slot count registers, each indicating a number of slots of the shared TRL assigned to each CRI of the plurality of CRIs. The IOV-HC is configured to receive a transfer request (TR) directed to the flash-memory-based storage device from a CRI of the plurality of CRIs. The IOV-HC is further configured to map, by a TR fetch circuit of the IOV-HC, the TR to a slot of the shared TRL based on a TRL slot offset register of the plurality of TRL slot offset registers and a TRL slot count register of the plurality of TRL slot count registers, the TRL slot offset register and the TRL slot count register corresponding to the CRI.

In another aspect, a method for providing virtual TRLs for multiple hosts is provided. The method comprises receiving, by an IOV-HC, a TR directed to a flash-memory-based storage device from a CRI of a plurality of CRIs. The method further comprises mapping, by a TR fetch circuit of the IOV-HC, the TR to a slot of a shared TRL based on a TRL slot offset register of a plurality of TRL slot offset registers and a TRL slot count register of a plurality of TRL slot count registers, the TRL slot offset register and the TRL slot count register corresponding to the CRI. The plurality of TRL slot offset registers each indicates the slot of the shared TRL that is assigned as a base slot to a corresponding CRI of the plurality of CRIs. The plurality of TRL slot count registers each indicates a number of slots of the shared TRL assigned to the corresponding CRI of the plurality of CRIs.

In another aspect, an IOV-HC is provided. The IOV-HC comprises a means for receiving a TR directed to a flash-memory-based storage device from a CRI of a plurality of CRIs. The IOV-HC further comprises a means for mapping the TR to a slot of a shared TRL based on a TRL slot offset register of a plurality of TRL slot offset registers and a TRL slot count register of a plurality of TRL slot count registers, the TRL slot offset register and the TRL slot count register corresponding to the CRI. The plurality of TRL slot offset registers each indicates the slot of the shared TRL that is assigned as a base slot to a corresponding CRI of the plurality of CRIs. The plurality of TRL slot count registers each indicates a number of slots of the shared TRL assigned to the corresponding CRI of the plurality of CRIs.

DETAILED DESCRIPTION

Figure 1:
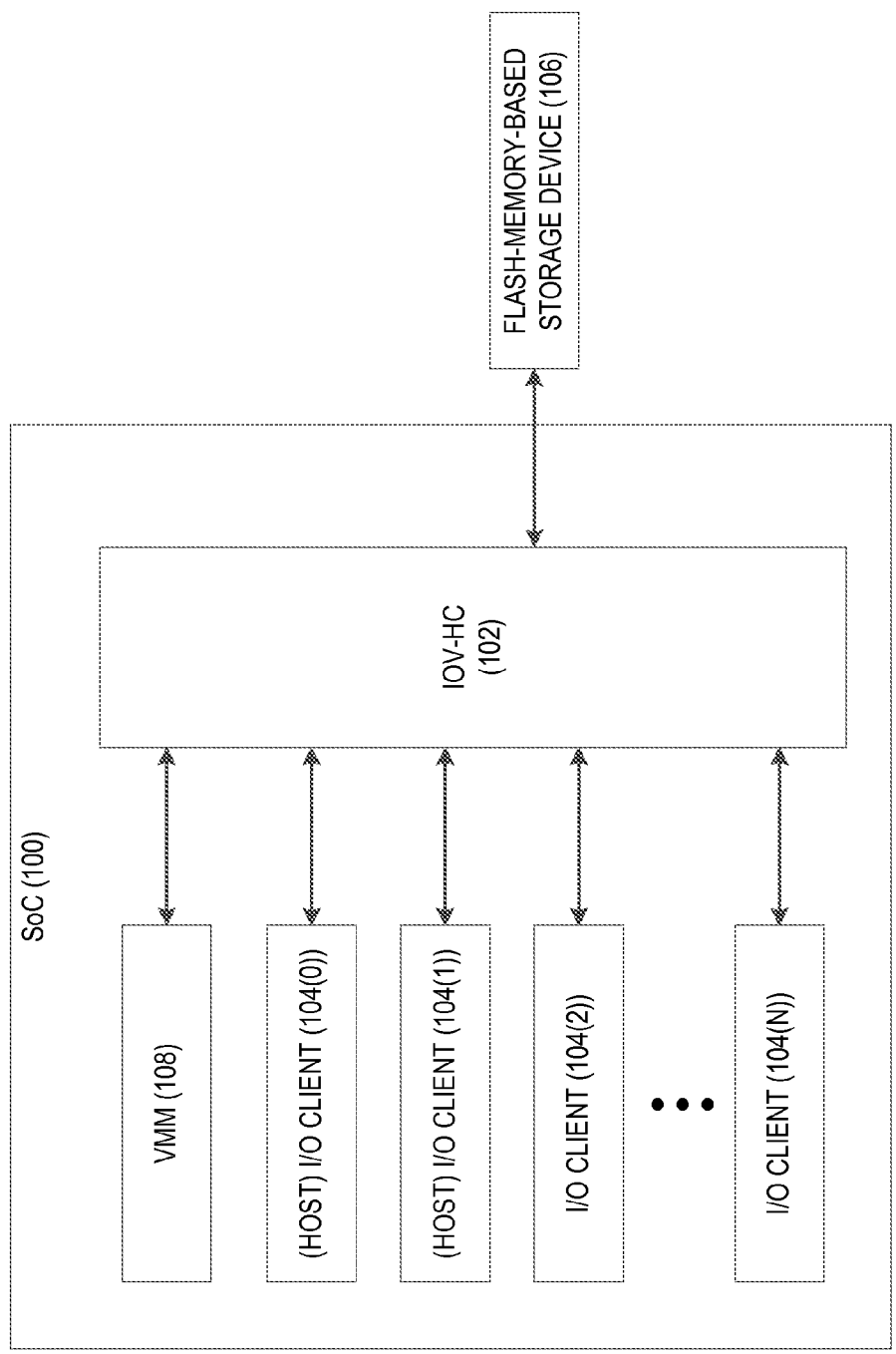
FIG. 1 is a block diagram of an exemplary flash-memory-based storage device and an exemplary system-on-a-chip (SoC) employing a plurality of hosts and an input/output virtualization (IOV) host controller (HC) (IOV-HC)

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include an input/output virtualization (IOY) host controller (HC) (IOV-HC) of a flash-memory-based storage device. In this regard, in one aspect, an IOV-HC provides access to a flash-memory-based storage device to multiple input/output (I/O) clients within a single system on a system-on-a-chip (SoC). In particular, the IOV-HC provides storage access to multiple I/O clients by providing a shared transfer request list (TRL), which comprises physical "slots" for issuing transfer requests (TRs), such as read/write transactions, to the flash-memory-based storage device. The IOV-HC implements a number of client register interfaces (CRIs), each of which is provided with its own virtual TRL that is made up of a subset of the slots of the shared TRL. The virtual TRLs are defined by TRL slot offset registers and TRL slot count registers maintained by the IOV-HC. Using the virtual TRLs, the IOV-HC may efficiently process TRs from multiple I/O devices to the flash-memory-based storage device and responses provided by the flash-memory-based storage device to the multiple I/O clients, in a manner transparent to the multiple I/O clients.

In this regard, FIG. 1 is a block diagram of an exemplary system-on-a-chip (SoC) 100 including an IOV-HC 102. In the example of FIG. 1, the IOV-HC 102 is provided to enable a plurality of I/O clients 104(0)-104(N) to access a single flash-memory-based storage device 106. In some aspects, the flash-memory-based storage device 106 may comprise a Universal Flash Storage (UFS) device or an Embedded MultiMediaCard (eMMC) device, as non-limiting examples. Notably, while the flash-memory-based storage device 106 is embedded adjacent to the SoC 100 within a mobile device in this aspect, other aspects may achieve similar functionality when employing the flash-memory-based storage device 106 as a removable memory device.

The SoC 100 also includes a virtual machine manager (VMM) 108, which provides virtualization functionality and management for the I/O clients 104(0)-104(N). The VMM 108 may be a software module that is executed by a processor (not shown) of the SoC 100, and that is resident in the system memory of the SoC 100 or other memory location as needed or desired. Each of the I/O clients 104(0)-104(N) may comprise a host software entity (such as the I/O client 104(0) and the I/O client 104(1) of FIG. 1), which is executed on the processor of the SoC 100 and/or on a processor subsystem (not shown) of the SoC 100. The IOV-HC 102 may act as an intermediary between the I/O clients 104(0)-104(N) and the flash-memory-based storage device 106. In this manner, the IOV-HC 102 may control interactions between the I/O clients 104(0)-104(N) and the flash-memory-based storage device 106 such that the I/O clients 104(0)-104(N) each interact with the flash-memory-based storage device 106 as if it were the only I/O client 104(0)-104(N) communicating with the flash-memory-based storage device 106. Similarly, the IOV-HC 102 may be configured to enable the flash-memory-based storage device 106 to operate as if it is communicating with only a single I/O client 104(0)-104(N), when, in fact, it is communicating with multiple I/O clients 104(0)-104(N).

Figure 2:
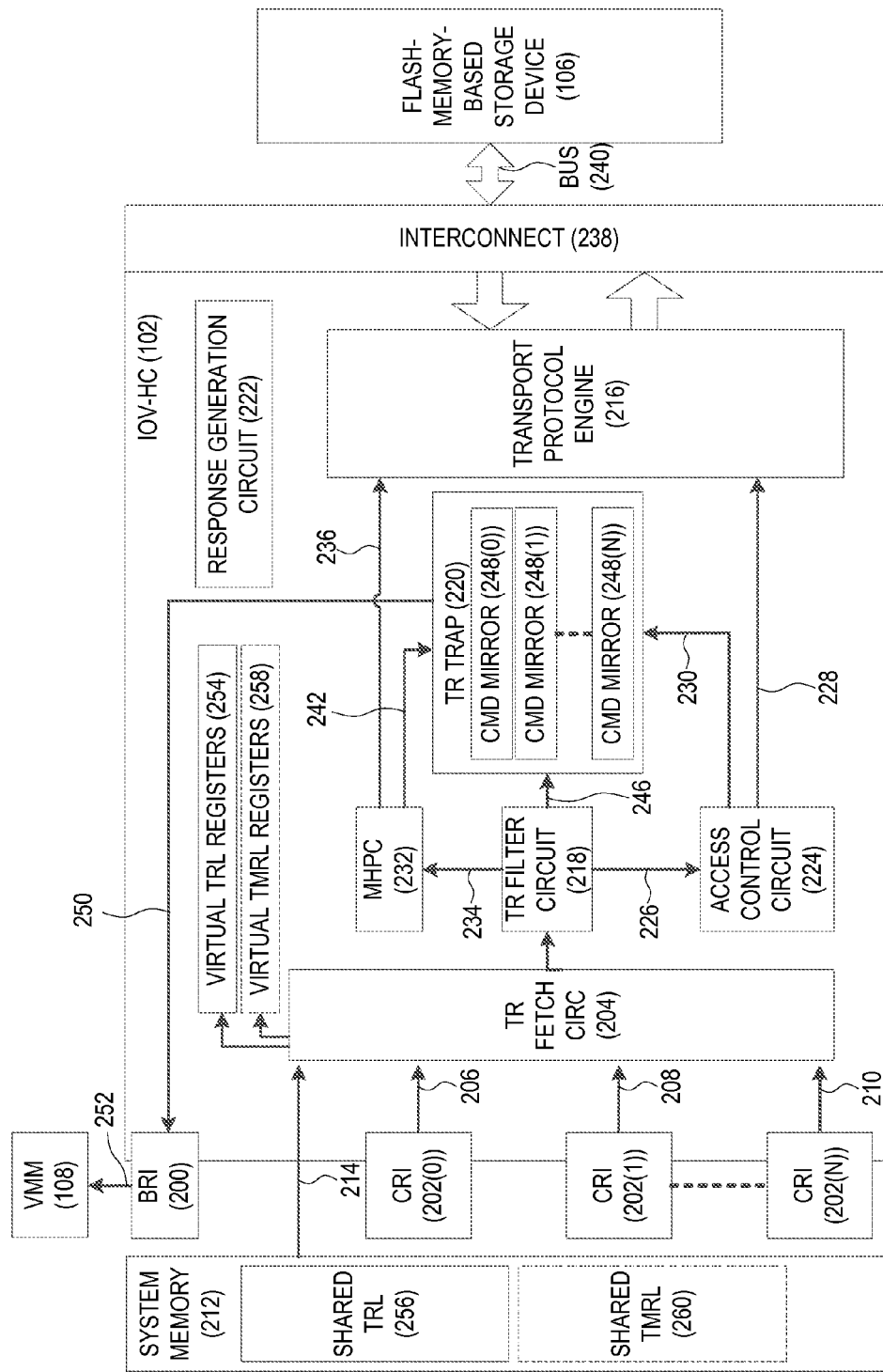
FIG. 2 is a block diagram of an exemplary IOV-HC employing virtual transfer request list (TRL) registers.

To better illustrate exemplary constituent elements of the IOV-HC 102 of FIG. 1 according to some aspects, FIG. 2 is provided. It is to be understood that the IOV-HC 102 may include more or fewer elements than illustrated in FIG. 2, according to the needs of the flash-memory-based storage device standard (e.g., UFS or eMMC, as non-limiting examples) in use. As seen in FIG. 2, the IOV-HC 102 includes a base register interface (BRI) 200 through which the VMM 108 of FIG. 1 may communicate with the IOV-HC 102. The IOV-HC 102 also includes client register interfaces (CRIs) 202(0)-202(N). Each of the CRIs 202(0)-202(N) represents an interface for corresponding ones of the I/O clients 104(0)-104(N) of FIG. 1 to transmit a TR (not shown) to the IOV-HC 102. The CRIs 202(0)-202(N) may also be used to transmit other, non-TR requests, such as queries or no-operation (NOP) instructions.

As seen in FIG. 2, the CRIs 202(0)-202(N) are communicatively coupled to a TR fetch circuit (TR FETCH CIRC) 204 of the IOV-HC 102, as indicated by arrows 206, 208, and 210, respectively. In some aspects, the TR fetch circuit 204 may be responsible for fetching a transport protocol descriptor, such as a UFS Transport Protocol (UTP) Transfer Request Descriptor (UTRD) (not shown) from system memory, and decoding the transport protocol descriptor to determine a location of a command descriptor such as a UTP command descriptor (UCD) (not shown). The TR fetch circuit 204 may then fetch a TR section (not shown) of the command descriptor from a system memory 212, as indicated by arrow 214.

In a conventional host controller, the TR fetch circuit 204 would then extract parameters from the TR, and forward the entire TR to a transport protocol engine 216 (e.g., a UTP engine or an eMMC transport protocol engine) for processing. However, in a multi-client environment, additional inspection and processing of the TR may be required. For instance, it may be desirable to provide custom handling for TRs of different types, or to trap or terminate a TR. Accordingly, the IOV-HC 102 is configured to provide command trapping functionality. The IOV-HC 102 thus includes a TR filter circuit 218 for TR inspection and processing, a TR trap 220 for command trapping, and a response generation circuit 222 for facilitating the transmission of responses resulting from trapped commands to the I/O clients 104(0)-104(N) (not shown). Operations of the TR filter circuit 218, the TR trap 220, and the response generation circuit 222 are discussed in greater detail below.

With continuing reference to FIG. 2, inspection and processing of every TR fetched by the TR fetch circuit 204 is carried out by the TR filter circuit 218 of the IOV-HC 102. The TR filter circuit 218 determines how a TR is to be processed based on its contents. If the contents of the TR indicate that the TR corresponds to a read or write command, the TR may be forwarded to an access control circuit 224 by the TR filter circuit 218, as indicated by arrow 226. The access control circuit 224 provides hardware enforcement of read/write access rules to logical units (not shown). If the TR is validated by the access control circuit 224, the TR is passed on to the transport protocol engine 216, as indicated by arrow 228. TRs that are denied by the access control circuit 224 are trapped for software processing, as indicated by arrow 230. If the contents of the TR indicate that the TR corresponds to a power mode change command, the TR is sent to a multi-host power controller (MHPC) 232 by the TR filter circuit 218, as indicated by arrow 234.

The MHPC 232 of FIG. 2 is a hardware state machine that controls the power modes of the flash-memory-based storage device 106 based on power mode change requests (not shown) from the I/O clients 104(0)-104(N). If the TR is successfully processed by the MHPC 232, the TR may be passed to the transport protocol engine 216, as indicated by arrow 236. The transport protocol engine 216 then communicates power mode change commands and responses with the flash-memory-based storage device 106 via an interconnect 238 and a bus 240. Otherwise, the MHPC 232 may silently discard the TR, or may trap the TR for software processing, as indicated by arrow 242. The MHPC 232 may also generate an error interrupt (not shown) upon notification by the flash-memory-based storage device 106 that a requested power mode change was unsuccessful. If the TR includes other commands, the TR may be intercepted and trapped by the TR filter circuit 218, as indicated by arrow 246.

As seen in FIG. 2, the TR trap 220 is provided by the IOV-HC 102 to store trapped TRs. Within the TR trap 220 are command (CMD) mirrors 248(0)-248(N), each associated with one of the CRIs 202(0)-202(N). A trapped TR is stored in a CMD mirror 248(0)-248(N) of a CRI 202(0)-202(N) from which the TR was received. An interrupt (represented by arrows 250 and 252) is generated to the VMM 108 via the BRI 200 to indicate that the TR is trapped. The VMM 108 may then further process the TR by reading the contents of the appropriate CMD mirror 248(0)-248(N) to extract information, and generating a response to the originating CRI 202(0)-202(N).

Once a TR is trapped, the TR fetch circuit 204 has completed its processing, and may proceed with fetching the next TR for another CRI 202(0)-202(N). Until the trapped TR is processed by the VMM 108, the CRI 202(0)-202(N) associated with the trapped TR is removed from TR fetch arbitration (not shown). Only when the VMM 108 processes the TR by ordering the IOV-HC 102 to forward or discard the TR may subsequent TRs from the same CRI 202(0)-202(N) be fetched by the TR fetch circuit 204.

While the aspects described above with respect to FIGS. 1 and 2 allow many functions to be enabled for use of the flash-memory-based storage device 106 by multiple hosts (e.g., the I/O clients 104(0)-104(N)), further issues remain with respect to processing TRs by the IOV-HC 102. In particular, a conventional host controller (HC) may provide a TRL (not shown) comprising a number of "slots" (in some aspects, up to thirty-two (32) slots, according to the UFS-HCI (UFS Host Controller Interface) standard and the eMMC standard). The TRL slots are used by software processes for issuing TRs to and receiving responses from the flash-memory-based storage device 106. However, in a multiple I/O client environment such as the SoC 100 of FIG. 1, the IOV-HC 102 needs to be able to allocate and track slots among the multiple I/O clients 104(0)-104(N). In some aspects, the same issue may arise with respect to allocation of slots of a task management request list (TMRL) (not shown).

In this regard, the IOV-HC 102 provides virtual TRL registers 254 for allocating slots of a shared TRL 256 as virtual TRLs (not shown) to the CRIs 202(0)-202(N) corresponding to the I/O clients 104(0)-104(N). Some aspects may also provide virtual TMRL registers 258 for allocating slots of a shared TMRL 260 as virtual TMRLs (not shown) to the CRIs 202(0)-202(N) corresponding to the I/O clients 104(0)-104(N). Use of the virtual TRL registers 254 is described in greater detail below with respect to FIGS. 3, 4A, and 4B, while use of the virtual TMRL registers 258 is described below with respect to FIGS. 5 and 6.

Figure 3:
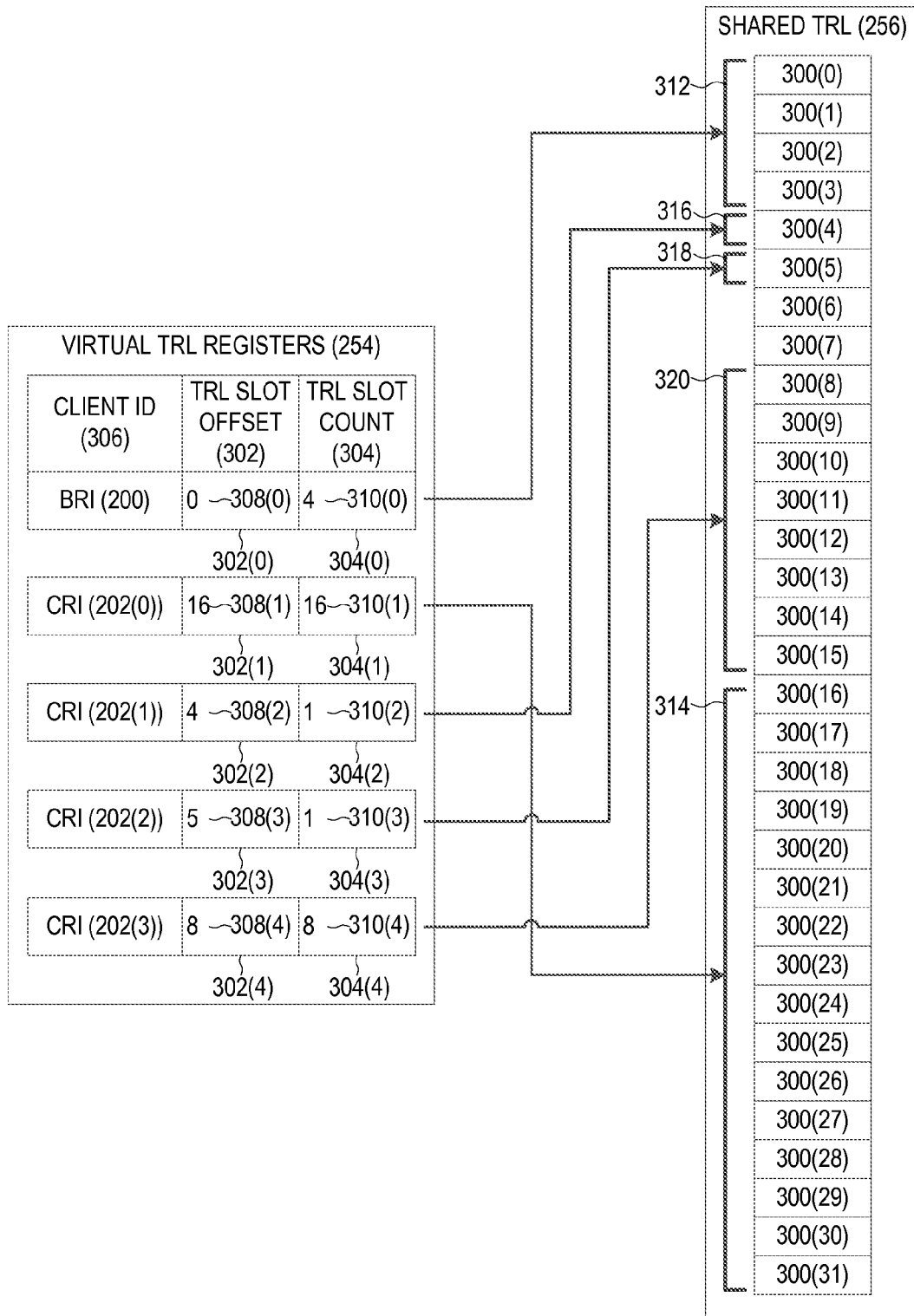
FIG. 3 is a block diagram illustrating exemplary allocation of slots in a shared TRL to multiple client register interfaces (CRIs) by the IOV-HC of FIG. 2 using the virtual TRL registers.

FIG. 3 provides a more detailed illustration of the shared TRL 256 and the virtual TRL registers 254 of FIG. 2. In the example of FIG. 3, the shared TRL 256 includes thirty-two (32) slots 300(0)-300(31). It is to be understood that in some aspects, the shared TRL 256 may comprise a number of slots greater than the thirty-two (32) slots 300(0)-300(31) illustrated here. The virtual TRL registers 254 of FIG. 3 include a plurality of TRL slot offset registers 302(0)-302(4) and a plurality of TRL slot count registers 304(0)-304(4). Each of the TRL slot offset registers 302(1)-302(4) and the TRL slot count registers 304(1)-304(4) correspond to a CRI 202(0)-202(3), as indicated by a Client ID column 306. For purposes of illustration, the TRL slot offset register 302(0) and the TRL slot count register 304(0) are associated with the BRI 200. In some aspects, the virtual TRL registers 254 may be accessible by the VMM 108 via the BRI 200 of FIG. 2. In particular, the size of the shared TRL 256 may be advertised to the VMM 108 via the BRI 200.

As seen in FIG. 3, portions of the shared TRL 256 may be allocated to the BRI 200 and each of the CRIs 202(0)-202(3) by the IOV-HC 102 using the corresponding TRL slot offset registers 302(0)-302(4) and the TRL slot count registers 304(0)-304(4). TRL slot offset register values 308(0)-308(4) of the TRL slot offset registers 302(0)-302(4) each represent an index of a base slot (i.e., a first assigned slot) to the BRI 200 and the CRIs 202(0)-202(3), respectively. Thus, the BRI 200 is assigned slot 300(0) as a base slot, as indicated by the TRL slot offset register value 308(0), while the CRI 202(0) is assigned slot 300(16) as a base slot, as indicated by the TRL slot offset register value 308(1). The CRIs 202(1)-202 (3) are assigned slots 300(4), 300(5), and 300(8), respectively, as indicated by the respective TRL slot offset register values 308(2)-308(4). According to some aspects, the TRL slot offset register values 308(0)-308(4) each are an integral power of two (e.g., 1, 2, 4, 8, etc.), and the settings for a particular CRI 202(0)-202(3) must be configured before the corresponding I/O client 104(0)-104(3) is enabled and should not be changed as long as the CRI 202(0)-202(3) is active.

With continuing reference to FIG. 3, the TRL slot count registers 304(0)-304(4) store corresponding TRL slot count register values 310(0)-310(4). The TRL slot count register values 310(0)-310(4) each indicate a number of the slots 300(0)-300(31) of the shared TRL 256 that are assigned to the BRI 200 and the CRIs 202(0)-202(3), respectively. As seen in FIG. 3, the BRI 200 is assigned 4 slots, as indicated by the TRL slot count register value 310(0). The BRI 200 is thus allocated a virtual TRL 312 made up of slots 300(0)-300(3) within the shared TRL 256. Similarly, the CRIs 202(0)-202(3) are allocated 16, 1, 1, and 8 slots, respectively, as indicated by corresponding TRL slot count register values 310(1)-310(4). The CRIs 202(0)-202(3) are thus allocated respective virtual TRLs 314, 316, 318, and 320, made up of corresponding slots 300(16)-300(31), 300(4), 300(5), and 300(8)-300(15). In an exemplary aspect, each of the TRL slot count register values 310(0)-310(4) is aligned to the corresponding TRL slot offset register values 308(0)-308(4), and the settings for a particular CRI 202(0)-202(3) must be configured before the corresponding I/O client 104(0)-104(3) is enabled and should not be changed as long as the CRI 202(0)-202(3) is active. These requirements are also optional.

In some aspects, upon initialization of the IOV-HC 102, the IOV-HC 102 may receive the TRL slot offset register values 308(0)-308(4) and the TRL slot count register values 310(0)-308(4) from the VMM 108, which may be responsible for allocation of the slots 300(0)-300(31). Some aspects may provide that the slots 300(0)-300(31) are allocated based on a static configuration (not shown) or on an outcome of a heuristic algorithm (not shown). According to some aspects, the IOV-HC 102 may receive a TRL slot offset register value, such as the TRL slot offset register value 308(4), and a TRL slot count register value, such as the TRL slot count register value 310(4), from the VMM 108 when a new CRI, such as the CRI 202(3), is created by the VMM 108. Some aspects may provide that the VMM 108 controls the parameters of the virtual TRLs 312, 314, 316, 318, 320 presented to the I/O clients 104(0)-104(3). In some aspects, the number and location of allocated slots 300(0)-300(31) may be written in a capability register (not shown) in the IOV-HC 102, and, in particular, in a register accessed by the VMM 108 through the BRI 200.

In conventional controllers based on UFS-HCI, capability fields, implemented as hardware constants and referred to as NUTRS and/or NUTMRS, are used to indicate a size of a TRL and/or a TMRL, respectively. In some aspects of the present disclosure, these fields may be incorporated into each of the CRIs 202(0)-202(N). In such aspects, the VMM 108 may write to these fields upon initialization or virtual machine creation to notify each of the I/O clients 104(0)-104(3) how many of the slots 300(0)-300(31) are allocated.

Figure 4A:
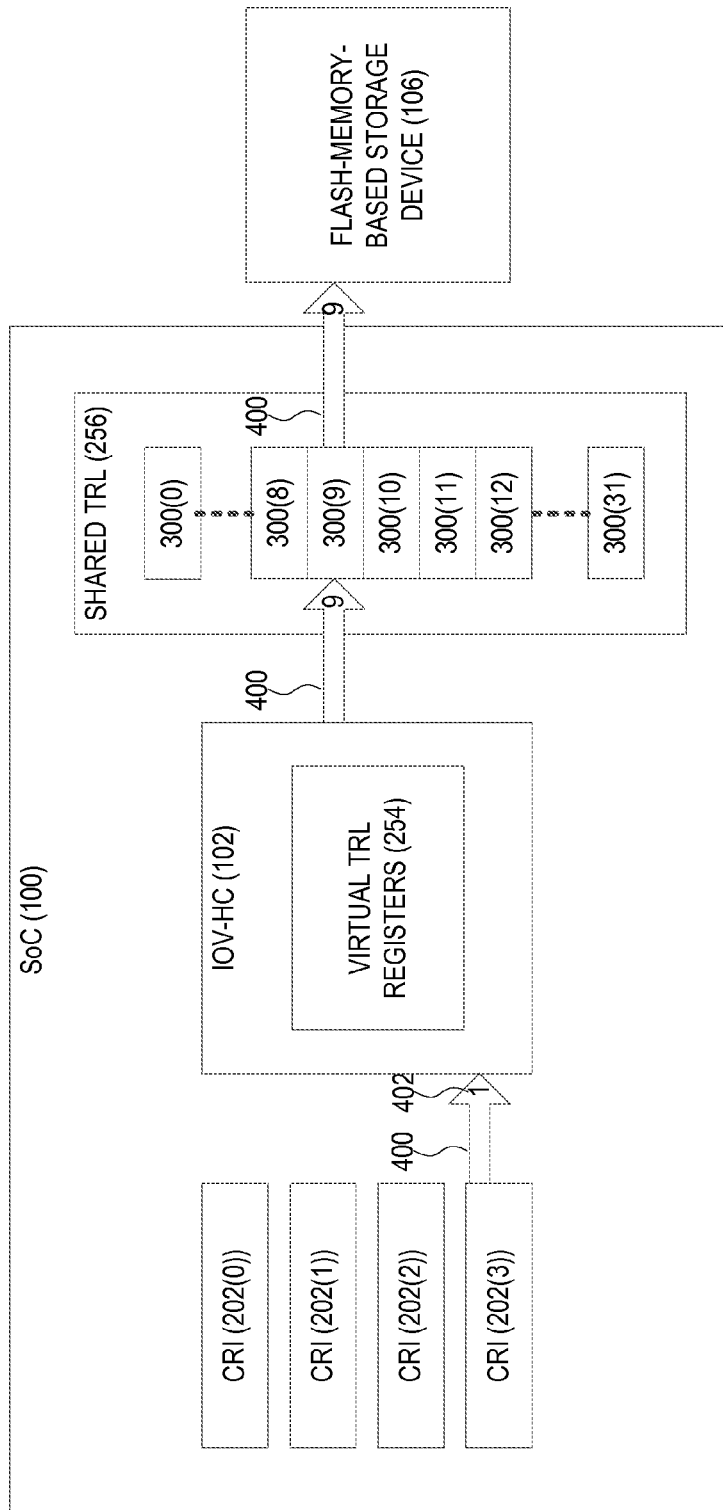
FIGS. 4A-4B are block diagrams illustrating exemplary operations of the IOV-HC of FIG. 2 for receiving a transfer request (TR), mapping the TR to a slot of a shared TRL using the virtual TRL registers of FIG. 2, and returning a response.
Figure 4B:
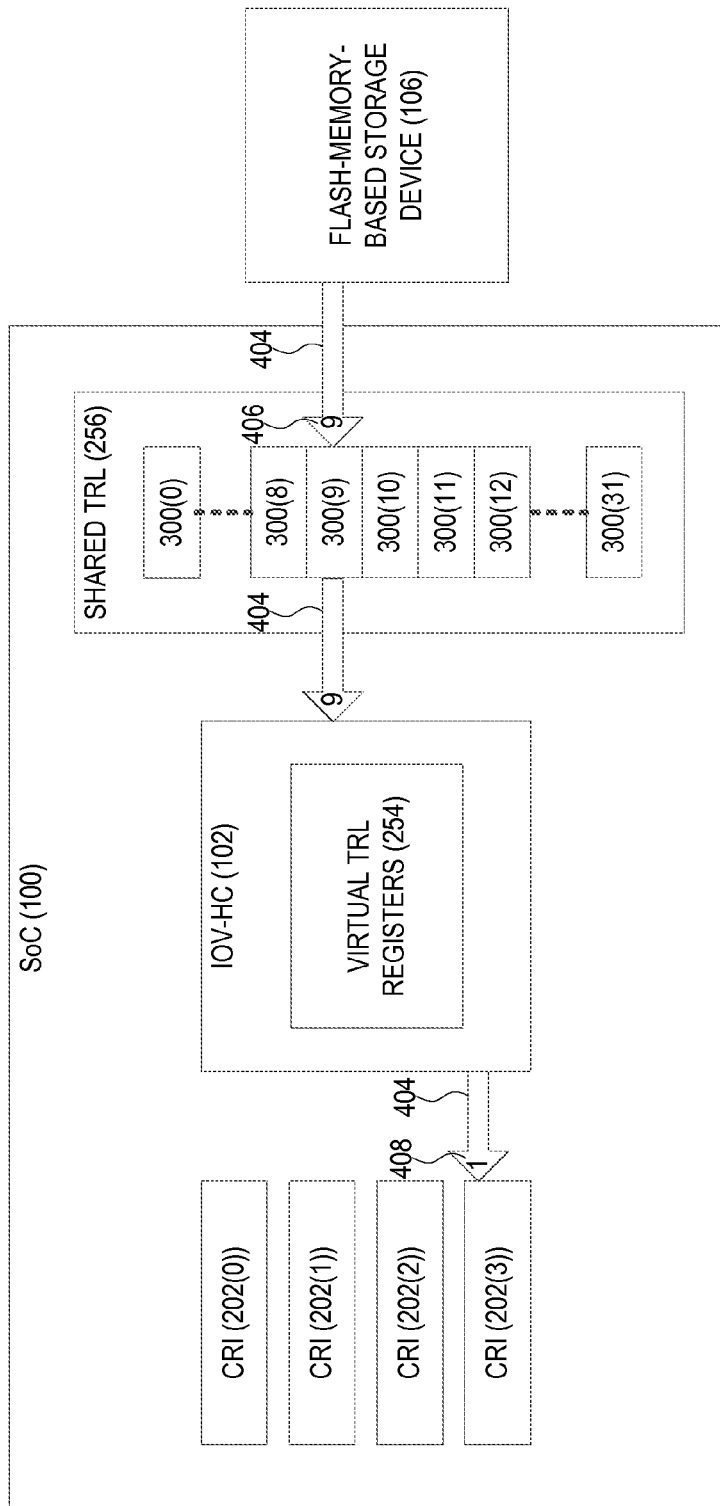

To illustrate exemplary operations of the IOV-HC 102 of FIG. 2 for receiving a TR, mapping the TR to a slot of the shared TRL 256 using the virtual TRL registers 254 of FIGS. 2 and 3, and returning a response, FIGS. 4A and 4B are provided. For the sake of clarity, elements of FIGS. 1-3 are referenced in describing FIGS. 4A and 4B. In FIG. 4A, the IOV-HC 102 receives a TR 400 from the CRI 202(3). The TR 400 includes a slot identifier 402, which in this example has a value of one (1) and represents an index to the second slot in the virtual TRL 320 of FIG. 3 allocated to the CRI 202(3). The IOV-HC 102 (in particular, the TR fetch circuit 204 of the IOV-HC 102) then maps the TR 400 to the slot 300(9) of the shared TRL 256 using the TRL slot offset register 302(4) and the TRL slot count register 304(4) corresponding to the CRI 202(3). For example, mapping may be accomplished by summing the slot identifier 402 with the TRL slot offset register value 308(4) corresponding to the CRI 202(3). As seen in FIG. 3, the TRL slot offset register value 308(4) is eight (8), which, when summed with the slot identifier 402 having a value of one (1), results in a slot index of nine (9). The recalculated slot index is then encoded by the IOV-HC 102 within the TR 400 to be transmitted to the flash-memory-based storage device 106. As non-limiting examples, in aspects based on UFS, the recalculated slot index may be encoded in a Task Tag field of the TR 400, while in aspects based on eMMC, the recalculated slot index may be encoded in a Task ID field of the TR 400. The IOV-HC 102 thus directs the TR 400 to the slot 300(9) of the shared TRL 256, and from there the TR 400 is processed serially and passed to the flash-memory-based storage device 106. Some aspects may provide that the TRL slot count register 304(4) is used for bounds-checking the slot identifier 402 to ensure that the TR 400 is directed to a valid slot 300(0)-300(31) of the virtual TRL 320. In such aspects, if the TR 400 is directed to a slot 300(0)-300(31) outside the range assigned to the corresponding CRI 202(0)-202(3), the TR 400 is trapped.

In FIG. 4B, the IOV-HC 102 receives a response 404 from the flash-memory-based storage device 106. The response 404 is directed to the same slot 300(9) from which the TR 400 was sent. Accordingly, the IOV-HC 102 routes the response 404 to the CRI 202(3) using the TRL slot offset register 302(4) and the TRL slot count register 304(4) corresponding to the CRI 202(3). As a non-limiting example, the IOV-HC 102 may subtract the TRL slot offset register value 308(4) (i.e., eight (8)) corresponding to the CRI 202(3) from a slot identifier 406 (nine (9)) of the response 404. As non-limiting examples, in aspects based on UFS, the slot identifier 406 may be retrieved from the Task Tag field of the response 404, while in aspects based on eMMC, the slot identifier 406 may be retrieved from the Task ID field of the response 404. The response 404 is then provided to the CRI 202(3) with a slot identifier 408 of one (1).

Figure 5:
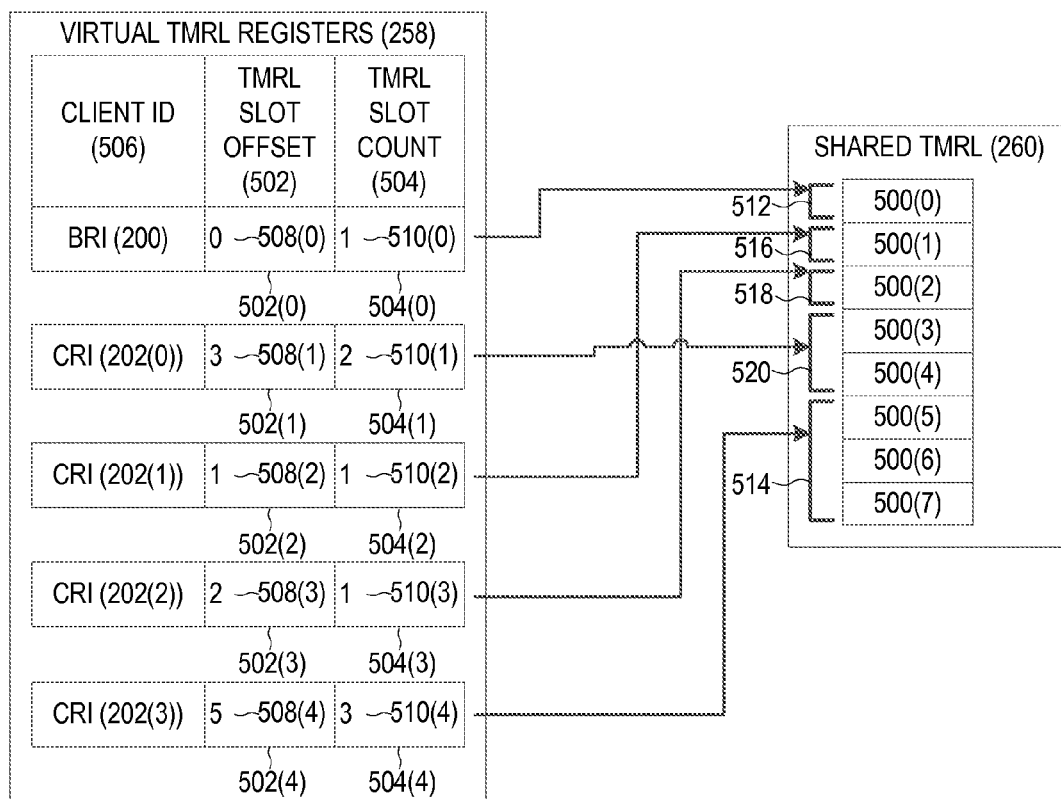
FIG. 5 is a block diagram illustrating exemplary allocation of slots in a shared task management request list (TMRL) to multiple CRIs by some aspects of the IOV-HC of FIG. 2 using virtual TMRL registers.

Some aspects of the present disclosure may further provide that the allocation of slots in a TMRL for multiple I/O clients 104(0)-104(N) is managed by the IOV-HC 102 in a manner similar to the allocation of the slots 300(0)-300(31) in the shared TRL 256 as described above. Accordingly, FIG. 5 is provided to illustrate exemplary aspects of the virtual TMRL registers 258 and the shared TMRL 260 of FIG. 2. In the example of FIG. 5, the shared TMRL 260 includes eight (8) slots 500(0)-500(7), although some aspects may provide more or fewer slots than illustrated here. The virtual TMRL registers 258 of FIG. 5 provide a plurality of TMRL slot offset registers 502(0)-502(4) and a plurality of TMRL slot count registers 504(0)-504(4). Each of the TMRL slot offset registers 502(1)-502(4) and the TMRL slot count registers 504(1)-504(4) correspond to a CRI 202(0)-202(3), as indicated by a Client ID column 506.

For purposes of illustration, the TMRL slot offset register 502(0) and the TMRL slot count register 504(0) are associated with the BRI 200.

As seen in FIG. 5, the IOV-HC 102 may allocate portions of the shared TMRL 260 to the BRI 200 and each of the CRIs 202(0)-202(3) using the corresponding TMRL slot offset registers 502(0)-502(4) and the TMRL slot count registers 504(0)-504(4). TMRL slot offset register values 508(0)-508(4) of the TMRL slot offset registers 502(0)-502(4) each represent an index of a base slot (i.e., a first assigned slot) to the BRI 200 and the CRIs 202(0)-202(3), respectively. The BRI 200 thus is assigned slot 500(0) as a base slot, as indicated by the TMRL slot offset register value 508(0), while CRI 202(0) is assigned slot 500(3) as a base slot, as indicated by the TMRL slot offset register value 508(1). CRIs 202(1)-202(3) are assigned slots 500(1), 500(2), and 500(5), respectively, as indicated by the respective TMRL slot offset register values 508(2)-508(4). According to some aspects, the TMRL slot offset register values 508(0)-508(4) each may be an integral power of two (e.g., 1, 2, 4, 8, etc.), and the settings for a particular CRI 202(0)-202(3) must be configured before the corresponding I/O client 104(0)-104(3) is enabled and should not be changed as long as the CRI 202(0)-202(3) is active.

Continuing to refer to FIG. 5, the TMRL slot count registers 504(0)-504(4) store corresponding TMRL slot count register values 510(0)-510(4). The TMRL slot count register values 510(0)-510(4) each indicate a number of the slots 500(0)-500(31) of the shared TMRL 260 that are assigned to the BRI 200 and the CRIs 202(0)-202(3), respectively. As seen in FIG. 5, the BRI 200 is assigned one (1) slots, as indicated by the TMRL slot count register value 510(0). The BRI 200 is thus allocated a virtual TMRL 512 made up of slot 500(0) within the shared TMRL 260. Similarly, CRIs 202(0)-202(3) are allocated 2, 1, 1, and 3 slots, respectively, as indicated by corresponding TMRL slot count register values 510(1)-510(4). CRIs 202(0)-202(3) are thus allocated respective virtual TMRLs 514, 516, 518, and 520, made up of slots 500(6)-500(7), 500(1), 500(2), and 500(3)-500(4) respectively. In an exemplary aspect, each of the TMRL slot count register values 510(0)-510(4) should be aligned to the corresponding TMRL slot offset register values 508(0)-508(4), and the settings for a particular CRI 202(0)-202(3) must be configured before the corresponding I/O client 104(0)-104(3) is enabled and should not be changed as long as the CRI 202(0)-202(3) is active. These requirements are also optional.

Figure 6:
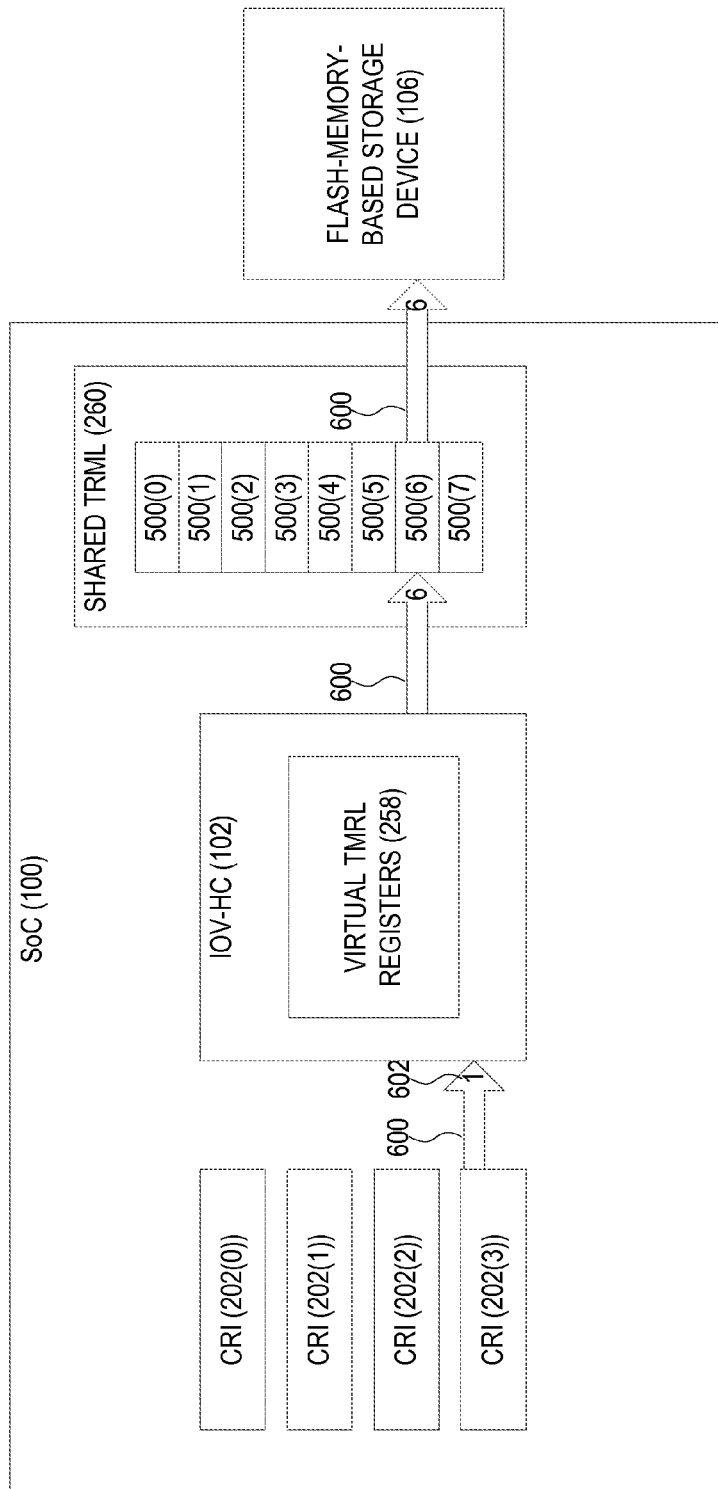
FIG. 6 is a block diagram illustrating operations of the IOV-HC of FIG. 2 for receiving a task management request (TMR), mapping the TMR to a slot of a shared TMRL using the virtual TMRL registers of FIG. 5, and returning a response.

To illustrate exemplary operations of the IOV-HC 102 of FIG. 2 for receiving a TMR and mapping the TMR to a slot of the shared TMRL 260 using the virtual TMRL registers 258 of FIGS. 2 and 5, FIG. 6 is provided. For the sake of clarity, elements of FIGS. 1, 2, and 5 are referenced in describing FIG. 6. In FIG. 6, the IOV-HC 102 receives a TMR 600 from the CRI 202(3). The TMR 600 includes a slot identifier 602, which in this example has a value of one (1) and represents an index to the second slot in the virtual TMRL 520 of FIG. 5 allocated to the CRI 202(3). The IOV-HC 102 (in particular, the TR fetch circuit 204 of the IOV-HC 102) then maps the TMR 600 to the slot 500(6) of the shared TMRL 260 using the TMRL slot offset register 502(4) and the TMRL slot count register 504(4) corresponding to the CRI 202(3). For example, mapping may be accomplished by summing the slot identifier 602 with the TMRL slot offset register value 508(4) corresponding to the CRI 202(3). As seen in FIG. 5, the TMRL slot offset register value 508(4) is five (5), which, when summed with the slot identifier 602 having a value of one (1), results in a slot index of six (6). The recalculated slot index is then encoded by the IOV-HC 102 within the TMR 600 to be transmitted to the flash-memory-based storage device 106. As non-limiting examples, in aspects based on UFS, the recalculated slot index may be encoded in a Task Tag field of the TMR 600, while in aspects based on eMMC, the recalculated slot index may be encoded in a Task ID field of the TMR 600. The IOV-HC 102 thus directs the TMR 600 to the slot 500(6) of the shared TMRL 260, and from there the TMR 600 is processed serially and passed to the flash-memory-based storage device 106. In some aspects, the TMRL slot count register 504(4) may be used for bounds-checking the slot identifier 602 to ensure that the TMR 600 is directed to a valid slot 500(1)-500(31) of the virtual TMRL 520.

Figure 7A:
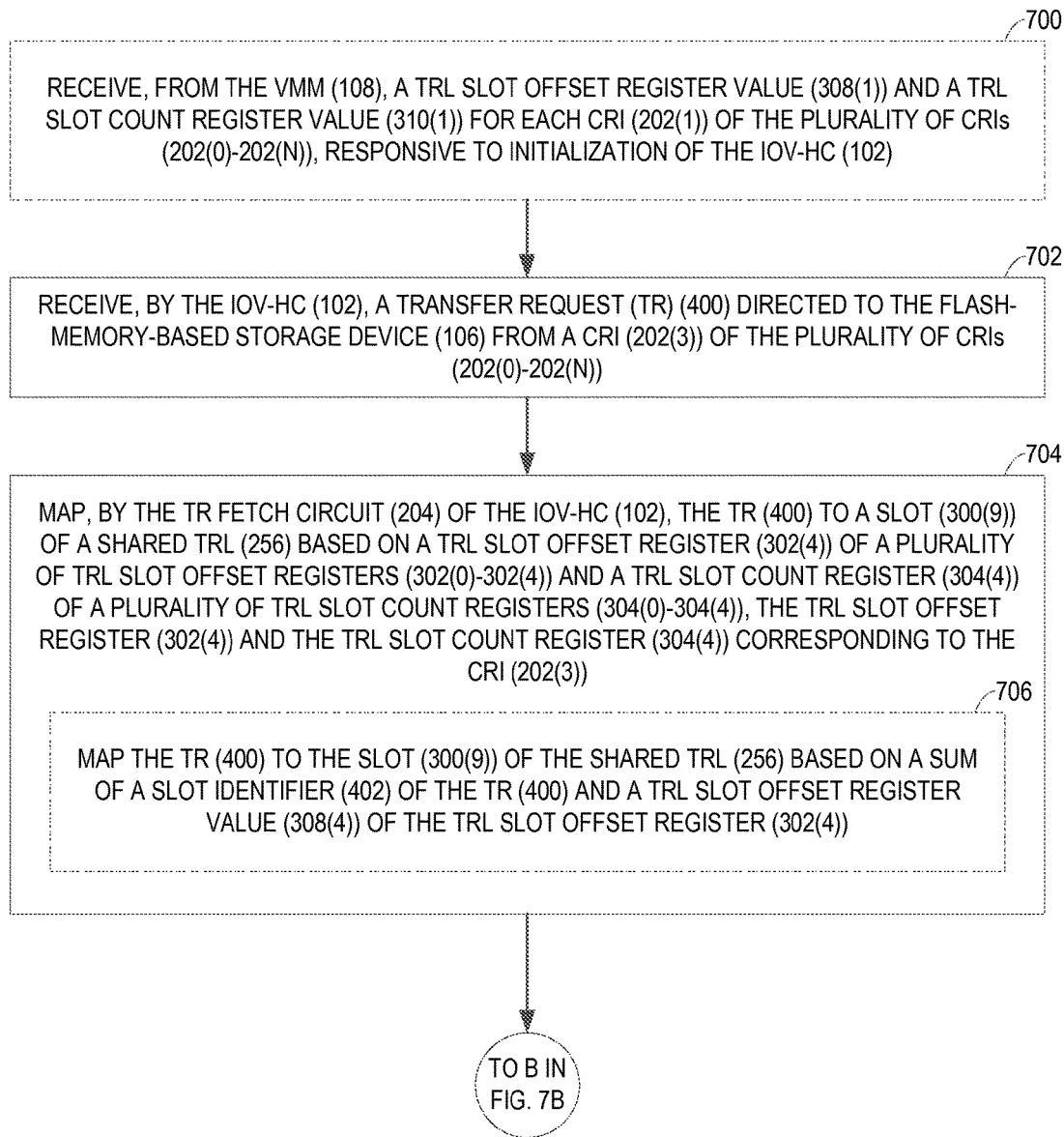
FIGS. 7A and 7B are flowcharts illustrating exemplary operations of the IOV-HC of FIG. 2 for allocating slots of a shared TRL using virtual TRL registers.
Figure 7B:
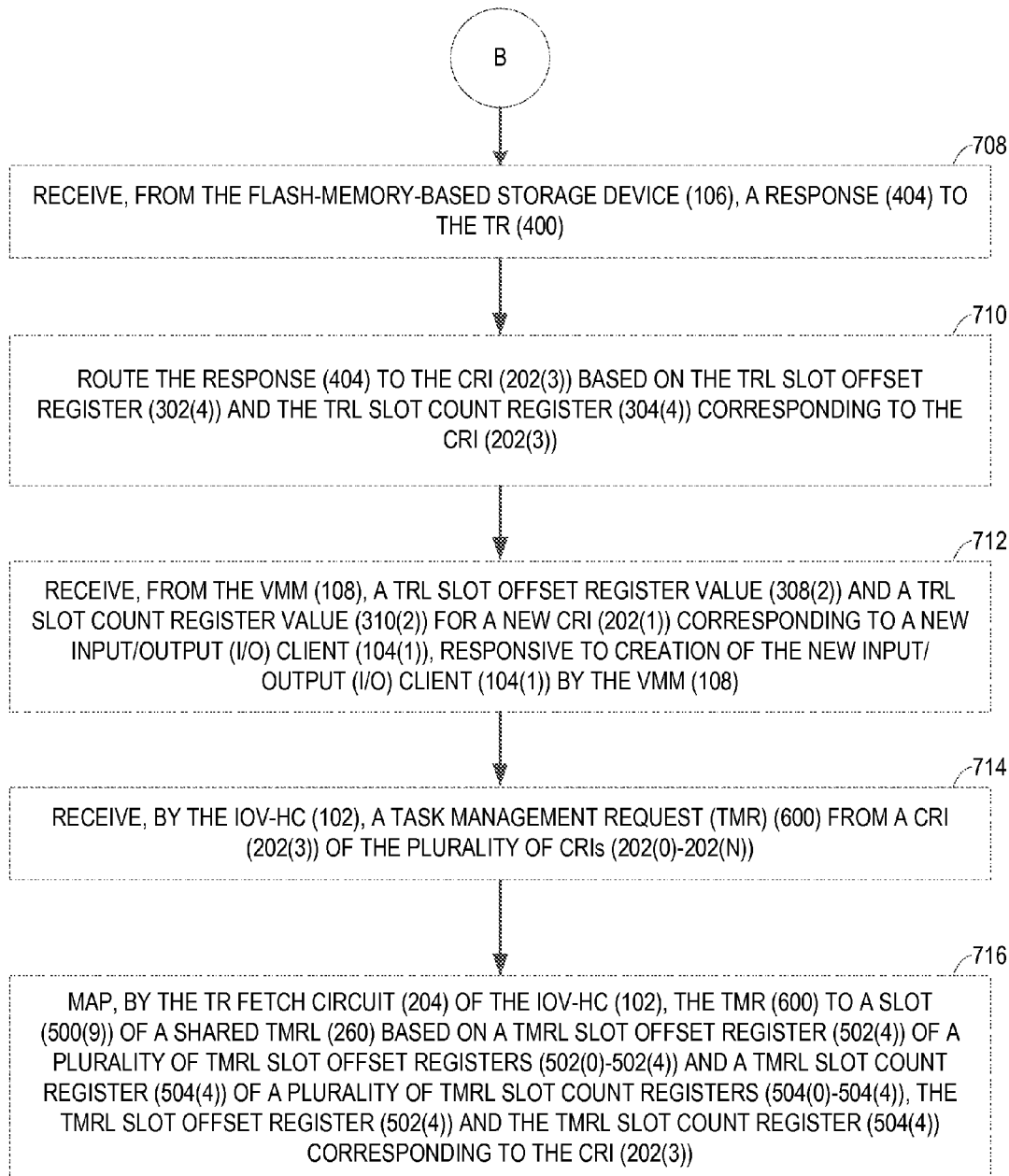

FIGS. 7A and 7B are provided to illustrate exemplary operations of the IOV-HC 102 of FIG. 1 for allocating slots of the shared TRL 256 using the virtual TRL registers 254 of FIG. 2. Elements of FIGS. 1-6 are referenced in describing FIGS. 7A and 7B for the sake of clarity. In FIG. 7A, operations according to some aspects may begin with the IOV-HC 102 receiving, from the VMM 108, a TRL slot offset register value (such as the TRL slot offset register value 308(1)) and a TRL slot count register value (such as the TRL slot count register value 310(1)) for each CRI 202(1) of the plurality of CRIs 202(0)-202(N), responsive to initialization of the IOV-HC 102 (block 700). The IOV-HC 102 thus may be referred to herein as a "means for receiving, from a VMM, a TRL slot offset register value and a TRL slot count register value for each CRI of the plurality of CRIs, responsive to initialization of the IOV-HC." The IOV-HC 102 then receives a TR 400 directed to the flash-memory-based storage device 106 from the CRI 202(3) of the plurality of CRIs 202(0)-202(N) (block 702). In this regard, the IOV-HC 102 may be referred to herein as a "means for receiving a TR directed to a flash-memory-based storage device from a CRI."

The IOV-HC 102 (and in particular, the TR fetch circuit 204 of the IOV-HC 102) next maps the TR 400 to a slot 300(9) of a shared TRL 256 based on a TRL slot offset register 302(4) of a plurality of TRL slot offset registers 302(0)-302(4) and a TRL slot count register 304(4) of a plurality of TRL slot count registers 304(0)-304(4) (block 704). Accordingly, the TR fetch circuit 204 may be referred to herein as a "means for mapping the TR to a slot of a shared TRL based on a TRL slot offset register of a plurality of TRL slot offset registers and a TRL slot count register of a plurality of TRL slot count registers." The TRL slot offset register 302(4) and the TRL slot count register 304(4) both correspond to the CRI 202(3). In some aspects, the operations of block 704 for mapping the TR 400 to the slot 300(9) may be based on a sum of a slot identifier 402 of the TR 400 and a TRL slot offset register value 308(4) of the TRL slot offset register 302(4) (block 706). Processing then continues at block 708 of FIG. 7B.

Referring now to FIG. 7B, the IOV-HC 102 according to some aspects may receive, from the flash-memory-based storage device 106, a response 404 to the TR 400 (block 708). The IOV-HC 102 thus may be referred to herein as a "means for receiving, from the flash-memory-based storage device, a response to the TR." Based on the TRL slot offset register 302(4) and the TRL slot count register 304(4) corresponding to the CRI 202(3), the IOV-HC 102 may route the response 404 to the CRI 202(3) (block 710). In this regard, the IOV-HC 102 may be referred to herein as a "means for routing the response to the CRI based on the TRL slot offset register and the TRL slot count register corresponding to the CRI." In some aspects, the IOV-HC 102 may receive, from the VMM 108, a TRL slot offset register value (such as the TRL slot offset register value 308(2)) and a TRL slot count register value (such as the TRL slot count register value 310(2)) for a new CRI 202(1) corresponding to a new I/O client 104(1), responsive to creation of the new I/O client 104(1) by the VMM 108 (block 712). Accordingly, the IOV-HC 102 may be referred to herein as a "means for receiving, from a VMM, a TRL slot offset register value and a TRL slot count register value for a new CRI corresponding to a I/O client."

As noted above, in some aspects, allocation of slots 500(0)-500(31) for task management for multiple I/O clients 104(0)-104(N) may be managed by the IOV-HC 102 in a manner similar to the allocation of slots 300(0)-300(31) in the shared TRL 256 as described above. Accordingly, in such aspects, the IOV-HC 102 may receive a TMR 600 from a CRI 202(3) of the plurality of CRIs 202(0)-202(N) (block 714). The IOV-HC 102 may thus be referred to herein as a "means for receiving a TMR from a CRI of the plurality of CRIs." The IOV-HC 102 (in particular, the TR fetch circuit 204 of the IOV-HC 102) may then map the TMR 600 to a slot 500(9) of a shared TMRL 260 based on a TMRL slot offset register 502(4) of a plurality of TMRL slot offset registers 502(0)-502(4) and a TMRL slot count register 504(4) of a plurality of TMRL slot count registers 504(0)-504(4), the TMRL slot offset register 502(4) and the TMRL slot count register 504(4) corresponding to the CRI 202(3) (block 716). In this regard, the TR fetch circuit 204 may be referred to herein as a "means for mapping the TMR to a slot of a shared TMRL based on a TMRL slot offset register of a plurality of TMRL slot offset registers and a TMRL slot count register of a plurality of TMRL slot count registers."

The IOV-HC of the flash-memory-based storage device according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
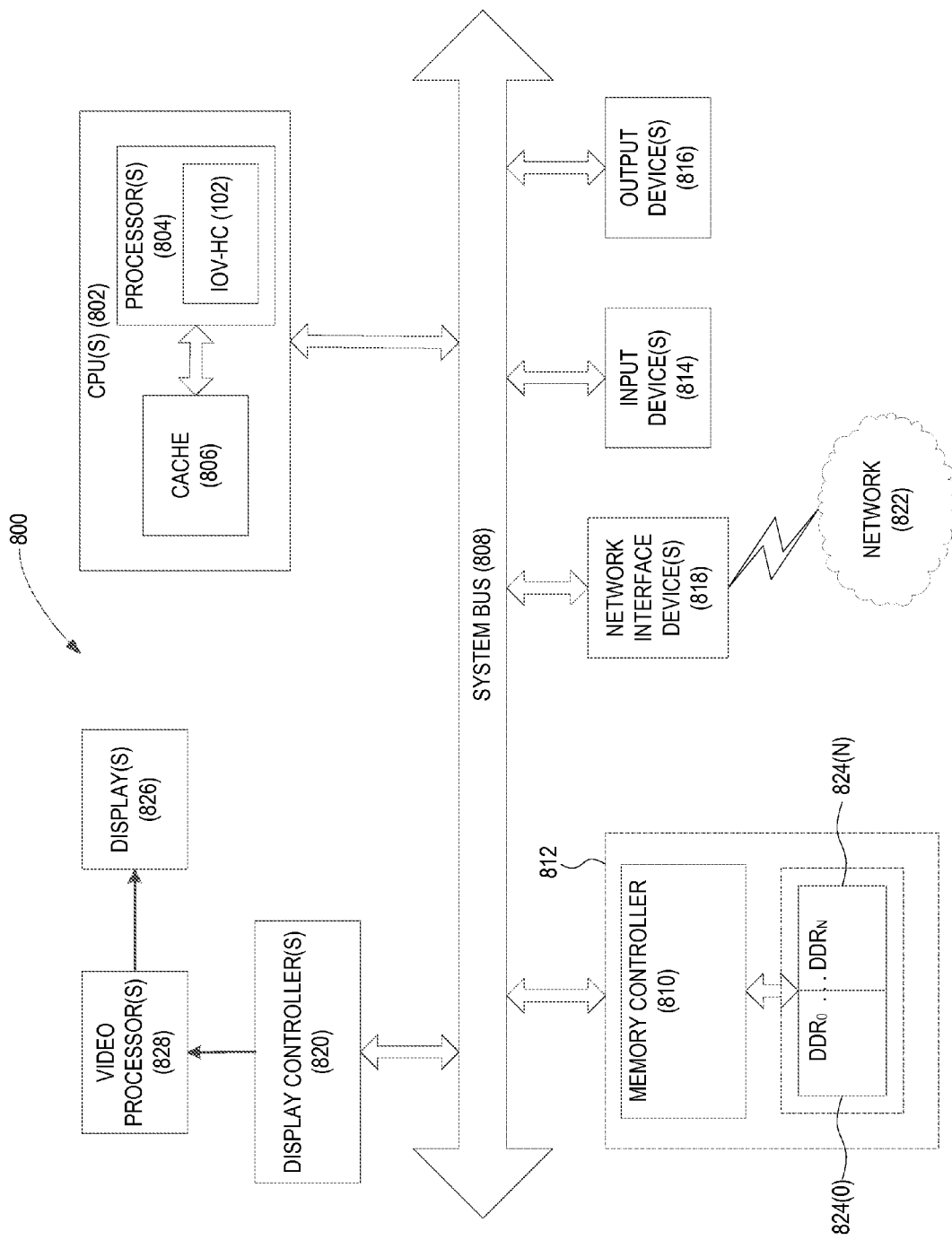
FIG. 8 is a block diagram of an exemplary computing device that may include an SoC that employs the virtual TRL registers of FIGS. 2 and 3 within the IOV-HC.

In this regard, FIG. 8 illustrates an example of a processor-based system 800 that can employ the SoC 100 of FIG. 2 with the IOV-HC 102 illustrated in FIG. 2. In this example, the processor-based system 800 includes one or more central processing units (CPUs) 802, each including one or more processors 804. The CPU(s) 802 may have cache memory 806 coupled to the processor(s) 804 for rapid access to temporarily stored data. The CPU(s) 802 is coupled to a system bus 808 and can intercouple devices included in the processor-based system 800. As is well known, the CPU(s) 802 communicates with these other devices by exchanging address, control, and data information over the system bus 808. For example, the CPU(s) 802 can communicate bus transaction requests to a memory controller 810 as an example of a slave device. Although not illustrated in FIG. 8, multiple system buses 808 could be provided.

Other devices can be connected to the system bus 808. As illustrated in FIG. 8, these devices can include a memory system 812, one or more input devices 814, one or more output devices 816, one or more network interface devices 818, and one or more display controllers 820, as examples. The input device(s) 814 can include any type of input device, including but not limited to input keys, switches, voice processors, etc. The output device(s) 816 can include any type of output device, including but not limited to audio, video, other visual indicators, etc. The network interface device(s) 818 can be any devices configured to allow exchange of data to and from a network 822. The network 822 can be any type of network, including but not limited to a wired or wireless network, a private or public network, a local area network (LAN), a wide local area network, wireless local area network, BLUETOOTH (BT), and the Internet. The network interface device(s) 818 can be configured to support any type of communications protocol desired. The memory system 812 can include one or more memory units 824(0)-824(N).

The CPU(s) 802 may also be configured to access the display controller(s) 820 over the system bus 808 to control information sent to one or more displays 826. The display controller(s) 820 sends information to the display(s) 826 to be displayed via one or more video processors 828, which process the information to be displayed into a format suitable for the display(s) 826. The display(s) 826 can include any type of display, including but not limited to a cathode ray tube (CRT), a liquid crystal display (LCD), a light emitting diode (LED) display, a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An input/output virtualization (IOV) host controller (HC) (IOV-HC) communicatively coupled to a plurality of input/output (I/O) clients via a corresponding plurality of client register interfaces (CRIs), and to a flash-memory-based storage device;
   the IOV-HC comprising:
      a plurality of transfer request list (TRL) slot offset registers, each indicating a slot of a shared TRL that is assigned as a base slot to each CRI of the plurality of CRIs; and
      a plurality of TRL slot count registers, each indicating a number of slots of the shared TRL assigned to each CRI of the plurality of CRIs; and
   the IOV-HC configured to:
      receive a transfer request (TR) directed to the flash-memory-based storage device from a CRI of the plurality of CRIs; and
      map, by a TR fetch circuit of the IOV-HC, the TR to a slot of the shared TRL based on a TRL slot offset register of the plurality of TRL slot offset registers and a TRL slot count register of the plurality of TRL slot count registers, the TRL slot offset register and the TRL slot count register corresponding to the CRI.

2. The IOV-HC of claim 1, configured to map the TR to the slot of the shared TRL based on a sum of a slot identifier of the TR and a TRL slot offset register value of the TRL slot offset register.

3. The IOV-HC of claim 1, further configured to:
   receive, from the flash-memory-based storage device, a response to the TR; and
   route, by the IOV-HC, the response to the CRI based on the TRL slot offset register and the TRL slot count register corresponding to the CRI.

4. The IOV-HC of claim 1, further configured to receive, from a virtual machine manager (VMM), a TRL slot offset register value and a TRL slot count register value for each CRI of the plurality of CRIs, responsive to initialization of the IOV-HC.

5. The IOV-HC of claim 1, further configured to receive, from a VMM, a TRL slot offset register value and a TRL slot count register value for a new CRI corresponding to a new I/O client, responsive to creation of the new I/O client by the VMM.

6. The IOV-HC of claim 1, further comprising:
   a plurality of task management request list (TMRL) slot offset registers, each indicating a slot of a shared TMRL that is assigned as a base slot to each CRI of the plurality of CRIs;
   a plurality of TMRL slot count registers, each indicating a number of slots of the shared TMRL assigned to each CRI of the plurality of CRIs; and
   the IOV-HC further configured to:
      receive a task management request (TMR) from a CRI of the plurality of CRIs; and
      map, by the TR fetch circuit of the IOV-HC, the TMR to a slot of the shared TMRL based on a TMRL slot offset register of the plurality of TMRL slot offset registers and a TMRL slot count register of the plurality of TMRL slot count registers, the TMRL slot offset register and the TMRL slot count register corresponding to the CRI.

7. The IOV-HC of claim 1, communicatively coupled to the flash-memory-based storage device according to an Embedded MultiMedia Card (eMMC) standard.

8. The IOV-HC of claim 1, communicatively coupled to the flash-memory-based storage device according to a Universal Flash Storage (UFS) standard.

9. The IOV-HC of claim 1 integrated into an integrated circuit (IC).

10. The IOV-HC of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

11. A method for providing virtual transfer request lists (TRLs) for multiple hosts, comprising:
   receiving, by an input/output virtualization (IOV) host controller (HC) (IOV-HC), a transfer request (TR) directed to a flash-memory-based storage device from a client register interface (CRI) of a plurality of CRIs; and
   mapping, by a TR fetch circuit of the IOV-HC, the TR to a slot of a shared TRL based on a TRL slot offset register of a plurality of TRL slot offset registers and a TRL slot count register of a plurality of TRL slot count registers, the TRL slot offset register and the TRL slot count register corresponding to the CRI;

wherein:
the plurality of TRL slot offset registers each indicates a slot of the shared TRL that is assigned as a base slot to a corresponding CRI of the plurality of CRIs; and
the plurality of TRL slot count registers each indicates a number of slots of the shared TRL assigned to the corresponding CRI of the plurality of CRIs.

12. The method of claim 11, wherein mapping the TR to the slot of the shared TRL is based on a sum of a slot identifier of the TR and a TRL slot offset register value of the TRL slot offset register.

13. The method of claim 11, further comprising:
receiving, from the flash-memory-based storage device, a response to the TR; and
routing the response to the CRI based on the TRL slot offset register and the TRL slot count register corresponding to the CRI.

14. The method of claim 11, further comprising receiving, from a virtual machine manager (VMM), a TRL slot offset register value and a TRL slot count register value for each CRI of the plurality of CRIs, responsive to initialization of the IOV-HC.

15. The method of claim 11, further comprising receiving, from a VMM, a TRL slot offset register value and a TRL slot count register value for a new CRI corresponding to a new input/output (I/O) client, responsive to creation of the new I/O client by the VMM.

16. The method of claim 11, further comprising:
receiving, by the IOV-HC, a task management request (TMR) from a CRI of the plurality of CRIs; and
mapping, by the TR fetch circuit of the IOV-HC, the TMR to a slot of a shared task management request list (TMRL) based on a TMRL slot offset register of a plurality of TMRL slot offset registers and a TMRL slot count register of a plurality of TMRL slot count registers, the TMRL slot offset register and the TMRL slot count register corresponding to the CRI;
wherein:
the plurality of TMRL slot offset registers each indicates a slot of the shared TMRL that is assigned as a base slot to the corresponding CRI of the plurality of CRIs; and
the plurality of TMRL slot count registers each indicates a number of slots of the shared TMRL assigned to the corresponding CRI of the plurality of CRIs.

17. The method of claim 11, wherein the flash-memory-based storage device comprises an Embedded MultiMedia Card (eMMC) device.

18. The method of claim 11, wherein the flash-memory-based storage device comprises a Universal Flash Storage (UFS) device.

19. An input/output virtualization (IOV) host controller (HC) (IOV-HC), comprising:
a means for receiving a transfer request (TR) directed to a flash-memory-based storage device from a client register interface (CRI) of a plurality of CRIs; and
a means for mapping the TR to a slot of a shared transfer request list (TRL) based on a TRL slot offset register of a plurality of TRL slot offset registers and a TRL slot count register of a plurality of TRL slot count registers, the TRL slot offset register and the TRL slot count register corresponding to the CRI;
wherein:
the plurality of TRL slot offset registers each indicates a slot of the shared TRL that is assigned as a base slot to a corresponding CRI of the plurality of CRIs; and
the plurality of TRL slot count registers each indicates a number of slots of the shared TRL assigned to the corresponding CRI of the plurality of CRIs.

20. The IOV-HC of claim 19, further comprising:
a means for receiving, from the flash-memory-based storage device, a response to the TR; and
a means for routing the response to the CRI based on the TRL slot offset register and the TRL slot count register corresponding to the CRI.

21. The IOV-HC of claim 19, further comprising a means for receiving, from a virtual machine manager (VMM), a TRL slot offset register value and a TRL slot count register value for each CRI of the plurality of CRIs, responsive to initialization of the IOV-HC.

22. The IOV-HC of claim 19, further comprising a means for receiving, from a VMM, a TRL slot offset register value and a TRL slot count register value for a new CRI corresponding to a new input/output (I/O) client, responsive to creation of the new I/O client by the VMM.

23. The IOV-HC of claim 19, further comprising:
a means for receiving a task management request (TMR) from a CRI of the plurality of CRIs; and
a means for mapping the TMR to a slot of a shared task management request list (TMRL) based on a TMRL slot offset register of a plurality of TMRL slot offset registers and a TMRL slot count register of a plurality of TMRL slot count registers, the TMRL slot offset register and the TMRL slot count register corresponding to the CRI;
wherein:
the plurality of TMRL slot offset registers each indicates a slot of the shared TMRL that is assigned as a base slot to a corresponding CRI of the plurality of CRIs; and
the plurality of TMRL slot count registers each indicates a number of slots of the shared TMRL assigned to the corresponding CRI of the plurality of CRIs.

* * * * *